US012443290B2

United States Patent
Tetzner et al.

(10) Patent No.: US 12,443,290 B2
(45) Date of Patent: Oct. 14, 2025

(54) MOUSE DEVICE WITH DETECTION FUNCTION OF NON-HUMAN MOUSE EVENTS AND DETECTION METHOD THEREOF

(71) Applicant: Voyetra Turtle Beach, Inc., San Diego, CA (US)

(72) Inventors: Thaddaeus Erasmus Georg Richard Tetzner, Hamburg (DE); Chih Wei Hung, New Taipei (TW); Min Chung Ke, New Taipei (TW); Chih Kai Yang, New Taipei (TW); Jhe Fu Liou, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/724,685

(22) PCT Filed: Dec. 19, 2022

(86) PCT No.: PCT/US2022/081902
§ 371 (c)(1),
(2) Date: Jun. 27, 2024

(87) PCT Pub. No.: WO2023/129824
PCT Pub. Date: Jul. 6, 2023

(65) Prior Publication Data
US 2025/0076999 A1    Mar. 6, 2025

(30) Foreign Application Priority Data

Dec. 29, 2021 (TW) .................................. 110149333
Dec. 30, 2021 (CN) .......................... 202111639735.5

(51) Int. Cl.
*G06F 3/0354* (2013.01)

(52) U.S. Cl.
CPC ............................... *G06F 3/03543* (2013.01)

(58) Field of Classification Search
CPC .................................................... G06F 3/03543
USPC ......................................................... 345/163
See application file for complete search history.

(56) References Cited

U.S. PATENT DOCUMENTS

2006/0038786 A1* 2/2006 Adan .................... G06F 3/038
345/163
2017/0140279 A1* 5/2017 Turgeman .............. G06N 20/00
2017/0185758 A1* 6/2017 Oliker .................. G06F 21/316
(Continued)

*Primary Examiner* — Mark Edwards
(74) *Attorney, Agent, or Firm* — Sheppard Mullin Richter & Hampton LLP (57) ABSTRACT

The present invention provides a mouse device with a detection function of non-human mouse events and a detection method thereof. A driver receives a plurality of movement mouse events through a computer device from a mouse device, executes a non-human movement detection on the movement mouse events to determine each movement mouse event as a suspicious event or a human-made event, executes an interference process when the suspicious events meet a non-human critical condition, and executes the plurality of movement mouse events when the suspicious events do not meet the non-human critical condition. The present invention can effectively detect non-human movement mouse events, and execute interference on the non-human movement mouse events to deter non-human operations.

14 Claims, 7 Drawing Sheets

(56) References Cited

U.S. PATENT DOCUMENTS

2017/0195356 A1* 7/2017 Turgeman ............... H04L 63/08
2022/0072430 A1* 3/2022 Pimenta Ribeiro ..... A63F 13/79

* cited by examiner

MOUSE DEVICE WITH DETECTION FUNCTION OF NON-HUMAN MOUSE EVENTS AND DETECTION METHOD THEREOF

CROSS-REFERENCE TO RELATED APPLICATIONS

This application is a National Phase application under 35 U.S.C. § 371 of PCT Application No. PCT/US2022/081902, filed Dec. 19, 2022, which application claims the benefit of Taiwan Patent Application No. 110149333, filed Dec. 29, 2021, and Chinese Patent Application No. 202111639735.5, filed on Dec. 30, 2021, which are hereby incorporated herein by reference in their entirety.

TECHNICAL FIELD

The present invention relates to a mouse device and a method thereof, and in particular, to a mouse device with a function of detecting non-human mouse events and a method for detecting non-human mouse events.

BACKGROUND ART

Figure 1:
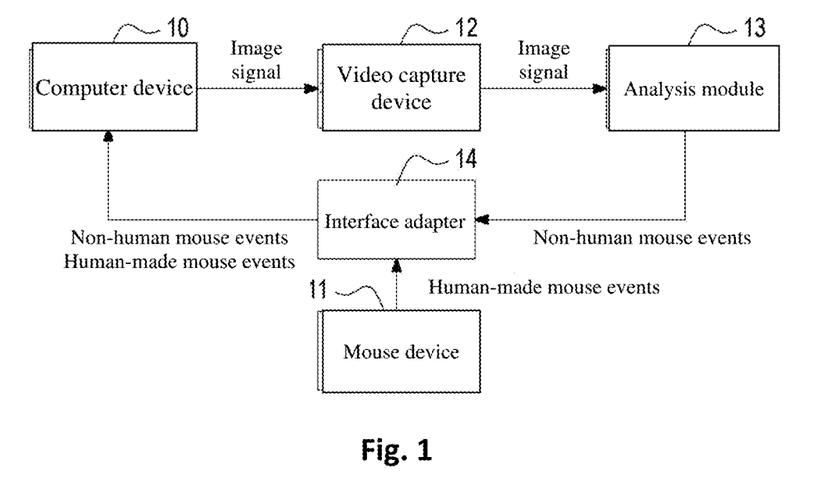
FIG. 1 is a schematic diagram of generating a non-human mouse event.

Please refer to FIG. 1, which is a schematic diagram of generating non-human mouse events.

A method for cheating in a computer game is currently known. A video capture device 12 is used to capture an image signal (such as a game screen) of a computer device 10, and then the image signal is input to an analysis module 13 (such as a computer having a machine learning function or an automatic identification function).

Next, the analysis module 13 can analyze the image signal to find out a target position (for example, the position of a person or treasure on the game screen), and then automatically generate a corresponding non-human mouse event (such as a movement mouse event to move toward the target position) based on the target position, and send the non-human mouse event to an interface adapter 14.

In addition, a human-made mouse event is triggered when a user operates a mouse device 11.

One end of the interface adapter 14 is connected to the computer device 10, and the other end thereof is connected to the mouse device 11 and the analysis module 13.

The interface adapter 14 can send both the human-made mouse events (player actions) generated by human operations and the non-human mouse events (cheating actions) automatically generated by the analysis module 13 to the computer device 10.

The computer device 10 then directly executes all received mouse events (including human-made mouse events and non-human mouse events).

Compared with player actions, the cheating actions automatically generated by the analysis module 13 are usually faster and more accurate. This gives those players who use the above cheating method a great advantage in the game, resulting in an unfair game.

Therefore, the existing mouse event processing has the above problems, and more effective solutions are urgently needed.

SUMMARY OF THE INVENTION

A main object of the present invention is to provide a mouse device with a function of detecting non-human mouse events and a method for detecting non-human mouse events, which can detect and interfere with non-human mouse events.

In one embodiment, a mouse device with a function of detecting non-human mouse events comprises a mouse device and a driver; the mouse device is used to electrically connect a computer device and transmit a plurality of movement mouse events to the computer device when the mouse device is moved, wherein the plurality of movement mouse events comprises a plurality of mouse coordinates; and the driver is installed on the computer device, and is used to execute, after being executed, a non-human movement detection on the plurality of movement mouse events based on the plurality of mouse coordinates to determine that the plurality of movement mouse events are suspicious or human man-made events, in the case where the suspicious events meet a non-human critical condition, an interference process is executed, in the case where the suspicious events do not meet the non-human critical condition, execute the plurality of movement mouse events.

In one embodiment, the driver is used to calculate an offset angle of three consecutive mouse coordinates, in the case where the offset angle is not greater than a critical angle, it is determined that the plurality of movement mouse events is a plurality of suspicious events, and in the case where the offset angle is greater than the critical angle, it is determined that the plurality of movement mouse events is a plurality of human-made events.

In one embodiment, the non-human critical condition comprises at least one of the following: a ratio of the plurality of suspicious events to the plurality of movement mouse events in a predetermined detection time period reaches a critical ratio; a cumulative number of the plurality of suspicious events during a predetermined detection time period reaches a critical cumulative number; and a consecutive number of the plurality of suspicious events reaches a critical consecutive number.

In one embodiment, the interference comprises at least one of the following: changing the mouse coordinates of the suspicious events to cause an operating system of the computer device to move a mouse pointer to the changed mouse coordinates; filtering out the suspicious events so that the operating system does not execute the suspicious events; filtering out a click mouse event received after the suspicious events so that the operating system does not execute the click mouse event after the suspicious events; and displaying a non-human operation prompt.

In one embodiment, the driver is used to receive a plurality of training mouse events within an analysis time period, the plurality of training mouse events comprises a plurality of mouse coordinates, and a training process is executed on the plurality of training mouse events to obtain at least one of a critical angle, a critical ratio, a critical cumulative number, a critical consecutive number, and a predetermined detection time period.

In one embodiment, the training process comprises at least one of the following: analyzing mouse coordinates of the training mouse events to obtain at least one of the critical angle, the critical ratio, the critical cumulative number, the critical consecutive number, and the preset detection time period; analyzing an image formed by mouse coordinates of the training mouse events to obtain at least one of the critical angle, the critical ratio, the critical cumulative number, the critical consecutive number, and the preset detection time period; and inputting mouse coordinates of the training mouse events into a machine learning model to obtain at least one of the critical angle, the critical ratio, the critical cumulative number, the critical consecutive number, and the preset detection time period.

In one embodiment, a method for detecting non-human mouse events comprises: step a: receiving a plurality of movement mouse events of a mouse device of a computer device, wherein the plurality of movement mouse events comprises a plurality of mouse coordinates; step b: executing a non-human movement detection on the plurality of movement mouse events based on the plurality of mouse coordinates to determine whether the plurality of movement mouse events are a plurality of suspicious events or a plurality of human-made events; step c: when the suspicious events meet a non-human critical condition, executing an interference process; and step d: when the suspicious events do not meet the non-human critical condition, executing the plurality movement mouse events.

[In one embodiment, the step a comprises: step a1: identifying a mouse device connected to a computer device through a driver; and step a2: receiving the plurality of movement mouse events through the driver.

In one embodiment, the step b comprises: step b1: calculating an offset angle of three consecutive mouse coordinates; step b2: when the offset angle is not greater than a critical angle, determining that the plurality of movement mouse events are the plurality of suspicious events; and step b3: when the offset angle is greater than the critical angle, determining that the movement mouse events are the plurality of human-made events.

In one embodiment, the non-human critical condition comprises at least one of the following: a ratio of the plurality of suspicious events to the plurality of movement mouse events received within a predetermined detection time period reaches a critical ratio; a cumulative number of the plurality of suspicious events received during the predetermined detection time reaches a critical cumulative number; and a consecutive number of the plurality of suspicious events reaches a critical consecutive number.

In one embodiment, the interference process comprises at least one of the following: step c1: changing the mouse coordinates of the plurality of suspicious events to cause an operating system of the computer device to move a mouse pointer to the changed mouse coordinates; step c2: filtering out the plurality of suspicious events so that the operating system does not execute the plurality of suspicious events; step c3: filtering out a click mouse event received after the plurality of suspicious events so that the operating system does not execute the click mouse event after the plurality of suspicious events; and step c4: displaying a non-human operation prompt.

In one embodiment, the method for detecting non-human mouse events further comprises at least one of the following steps prior to the step b: step e1: receiving a plurality of training mouse events during an analysis time period, wherein the plurality of training mouse events comprises a plurality of mouse coordinates; and step e2: executing a training process on the plurality of training mouse events to obtain at least one of a critical angle, a critical ratio, a critical cumulative number, a critical consecutive number, and a predetermined detection time period.

In one embodiment, the training process comprises at least one of the following: step f1: analyzing the mouse coordinates of the training mouse events to obtain at least one of the critical angle, the critical ratio, the critical cumulative number, the critical consecutive number, and the preset detection time period; step f2: analyzing an image formed by the mouse coordinates of the training mouse events to obtain at least one of the critical angle, the critical ratio, the critical cumulative number, the critical consecutive number, and the preset detection time period; and step f3: inputting the mouse coordinates of the training mouse events into a machine learning model to obtain at least one of the critical angle, the critical ratio, the critical cumulative number, the critical consecutive number, and the preset detection time period.

The present invention is able to effectively detect non-human movement mouse events, and execute interference on the non-human movement mouse events to deter non-human operations.

IN THE FIGURES

11: Mouse device; 10: Computer device; 12: Video capture device; 13: Analysis module; 14: Interface adapter; 20: Mouse device; 21: Driver; 3: Computer device; 30: Processor; 300: Application; 301: Operating system; 31: Storage device; 32: Display; 33: Communication interface; 40: Non-human movement detection module; 41: Interference module; 42: Training module; A, B, C: mouse coordinates; S10-S14: Detection and interference steps; S20-S21: Training steps; S30-S32: Critical data generation steps; S40-S41: Drive steps; S50-S53: Detection steps; S60-S63: Interference steps

DESCRIPTION OF THE EMBODIMENTS

The present invention will be further described below in conjunction with the accompanying drawings and specific embodiments, so that a person skilled in the art can better understand the present invention and implement the present invention. However, the examples provided herein are not intended to limit the present invention.

Figure 2:
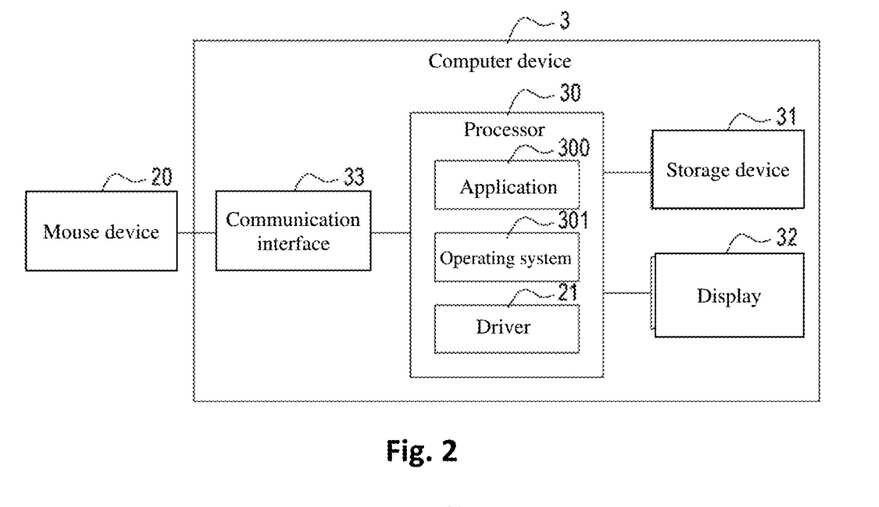
FIG. 2 is a structural diagram of a mouse device according to an embodiment of the present invention.

Please refer to FIG. 2, which is a structural diagram of a mouse device according to an embodiment of the present invention.

The present invention provides a mouse device with a function of detecting non-human mouse events, including a mouse device 20 and a driver 21.

The mouse device 20 can be electrically connected to a communication interface 33 (for example, a Bluetooth interface or a USB interface) of a computer device 3. When the mouse device 20 is moved or clicked by a user, a corresponding movement mouse event or a click mouse event can be triggered, and the movement mouse event or a click mouse event is then transmitted to the computer device 3.

The computer device 3 has a storage device 31, a display 32, the communication interface 33, and a processor 30 electrically connected to the above-mentioned devices.

The driver 21 is installed in the computer device 3 and can be executed by the processor 30 to implement the detection method of the present invention.

The processor 30 can execute the driver 21 to identify the movement mouse event or the click mouse event, and execute the received mouse event through an operating system 301 to affect an application 300 (for example, a main game program).

Figure 3:
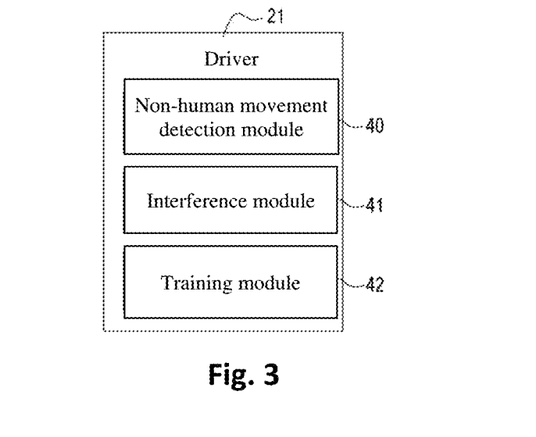
FIG. 3 is a structural diagram of a driver according to an embodiment of the present invention.

Please refer to FIG. 2 and FIG. 3, FIG. 3 is a structural diagram of a driver according to an embodiment of the present invention.

In one embodiment, the driver 21 includes a non-human movement detection module 40, an interference module 41, and a training module 42.

The non-human movement detection module 40 is used to detect non-human mouse events.

The interference module 41 is used for interference when a non-human mouse event is detected.

The training module 42 is used to generate and maintain detection rules for non-human mouse events.

The aforementioned modules are connected to each other (which may be electrical connection or information connection), and may be firmware software modules. The storage device 31 may include a non-transitory computer-readable recording medium. The aforementioned non-transitory computer-readable recording medium stores the driver 21. The driver 21 stores a program code executable by the computer. After the processor 30 executes the aforementioned program code, the functions of the aforementioned modules can be implemented.

Figure 4:
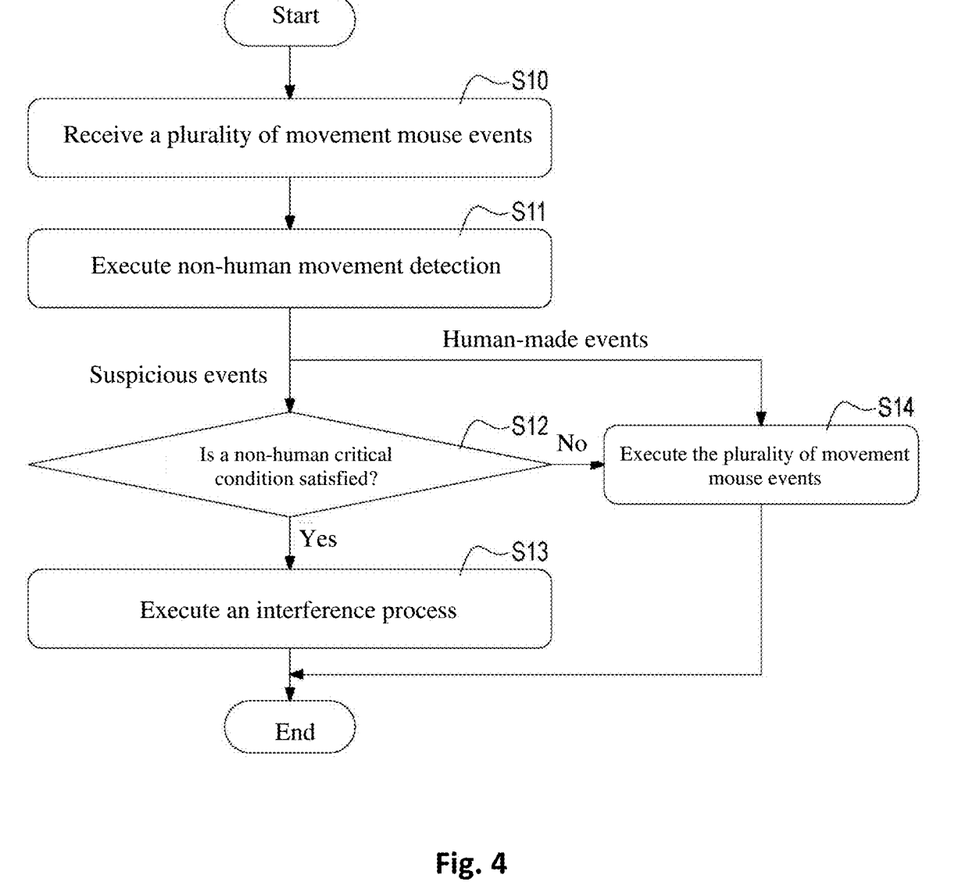
FIG. 4 is a flowchart of a detection method according to an embodiment of the present invention.

Please refer to FIG. 2 to FIG. 4. FIG. 4 is a flowchart of a detection method according to an embodiment of the present invention. The detection method of this embodiment includes the following steps S10 to S14.

In step S10, the processor 30 receives a plurality of movement mouse events triggered by a user operating the mouse device 20 through the driver 21.

In one embodiment, the aforementioned plurality of movement mouse events can include a plurality of mouse coordinates, that is, the movement positions of the mouse.

In step S11, the processor 30 executes non-human movement detection on the plurality of movement mouse events based on the plurality of mouse coordinates through the non-human movement detection module 40 of the driver 21 to determine that each movement mouse event is a suspicious event or human-made event.

If any movement mouse event is determined to be a suspicious event, step S12 is executed.

If all movement mouse events are determined to be human-made events, step S14 is executed.

In one embodiment, the processor 30 preliminarily determines that a corresponding movement mouse event is a suspicious event through the driver 21 when an offset amount(s) or an offset angle(s) of a plurality of consecutive mouse coordinates is too small.

Figure 9A:
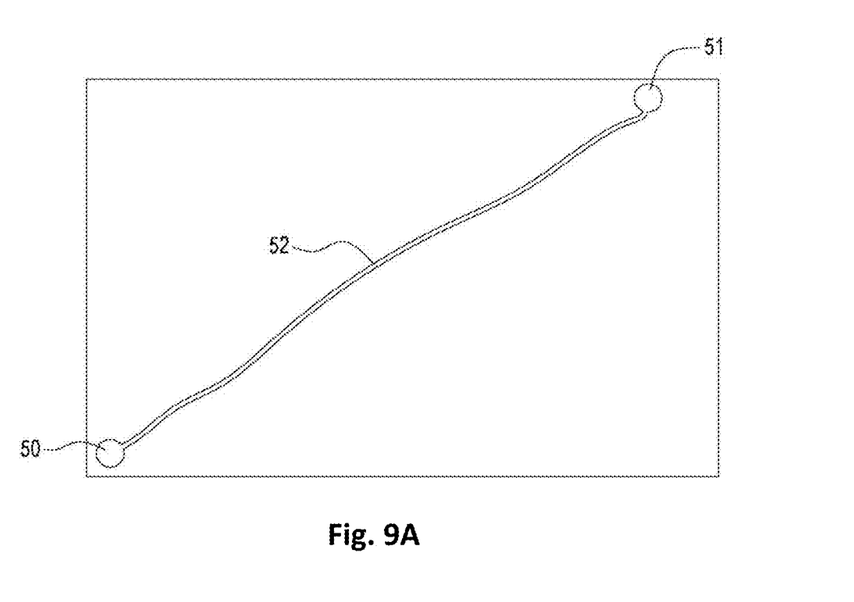
FIG. 9A is a schematic diagram of a human-made movement mouse event.
Figure 9B:
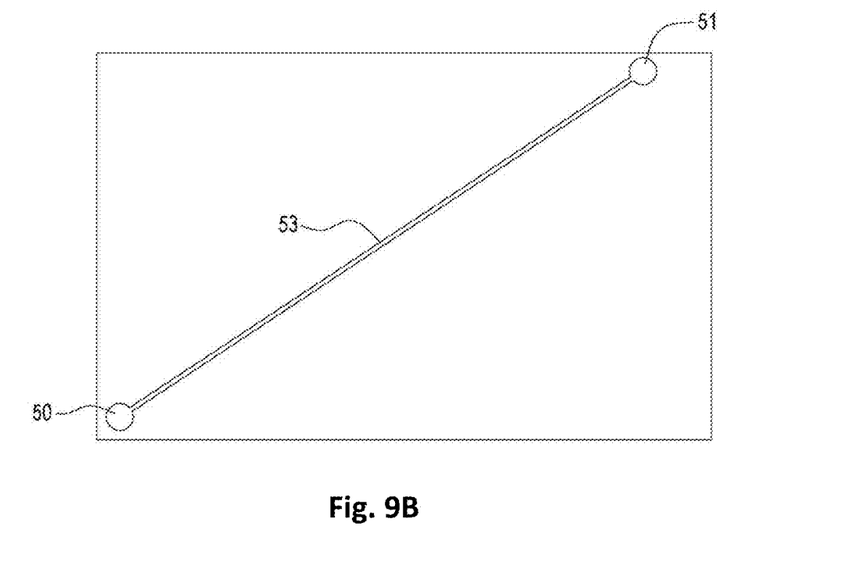
FIG. 9B is a schematic diagram of a non-human movement mouse event.

Please refer to FIG. 9A and FIG. 9B. FIG. 9A is a schematic diagram of a human-made movement mouse event. FIG. 9B is a schematic diagram of a non-human movement mouse event.

As shown in FIG. 9A, when the mouse device 20 is moved from a start point 50 to an end point 51, in the case of human-made operation, the trajectory 52 formed by a plurality of consecutive mouse coordinates must be distorted (the offset angle is relatively large).

As shown in FIG. 9B, in the case of non-human operation, since the end point 51 can be directly set as the end point, the trajectory 53 formed by a plurality of consecutive mouse coordinates must be a straight line or an approximate straight line (the offset angle is relatively small).

Please refer to FIG. 4 again, in step S12, the processor 30 determines whether the current suspicious event meets a predetermined non-human critical condition through the non-human movement detection module 40 of the driver 21.

In one embodiment, the non-human critical condition may be that a ratio of a plurality of suspicious events to a plurality of movement mouse events within a predetermined detection time period (for example, 5 minutes) reaches a critical ratio (for example 50%).

In one embodiment, the non-human critical condition may be that the cumulative number of suspicious events received within a predetermined detection time period (for example, 60 seconds) reaches a critical cumulative number (for example, 100 events).

In one embodiment, the non-human critical condition may be that the number of the plurality of consecutive suspicious events reaches a critical number (for example, 10 consecutive movement mouse events are determined as suspicious events).

If the suspicious events meet the non-human critical condition, step S13 is executed.

If the suspicious events do not meet the non-human critical condition, step S14 is executed.

In step S13, the processor 30 executes an interference process through the interference module 41 of the driver 21 to interfere with the user's operation of the mouse or undermine the smoothness of the user's operation of the mouse.

In step S14, the processor 30 executes a plurality of mouse movement events through the driver 21; so that the mouse pointer is moved to a designated mouse coordinate.

The present invention can effectively detect non-human movement mouse events, and execute interference on the non-human movement mouse events to deter non-human operations.

Figure 5:
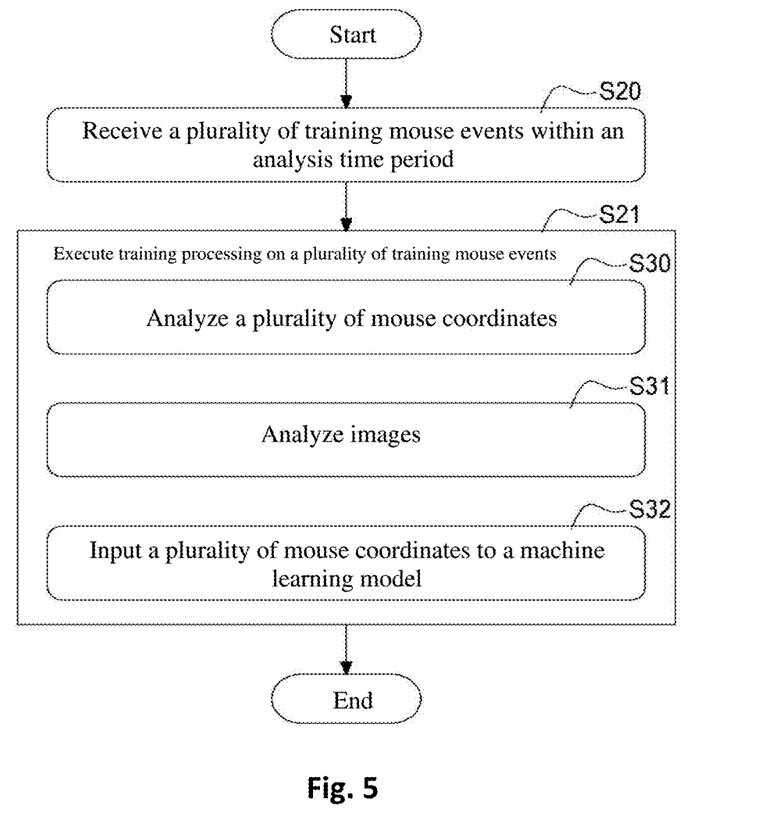
FIG. 5 is a partial flowchart of a detection method according to an embodiment of the present invention.

Please refer to FIG. 2 to FIG. 5. FIG. 5 is a partial flowchart of a detection method according to an embodiment of the present invention. Compared with the detection method of FIG. 4, the detection method in this embodiment may include steps S20 to S21 prior to executing the non-human movement detection.

In step S20, the processor 30 receives a plurality of training mouse events within a predetermined analysis time period (for example, 5 minutes) through the training module 42 of the driver 21. The aforementioned plurality of training mouse events may respectively include a plurality of mouse coordinates.

In step S21, the processor 30 executes training processing on a plurality of training mouse events through the training module 42 of the driver 21 to obtain critical data for non-human movement detection.

In one embodiment, the aforementioned critical data may be a critical angle, a critical ratio, a critical cumulative number, a critical continuous number, and/or a predetermined detection time period.

In one embodiment, the aforementioned training process may include at least one of the following steps S30 to S32.

In step S30, the processor 30 obtains critical data by analyzing a plurality of mouse coordinates of a plurality of training mouse events through the training module 42 of the driver 21.

In one embodiment, the processor 30 may analyze three consecutive mouse coordinates, analyze ten consecutive mouse coordinates, etc., to obtain the offset angle of a plurality of consecutive mouse coordinates as critical data.

In step S31, the processor 30 obtains critical data by analyzing images formed by a plurality of mouse coordinates of a plurality of training mouse events through the training module 42 of the driver 21.

In one embodiment, the processor 30 may execute feature extraction on the image to obtain image features as critical data. In addition, in the subsequent detection, the image features can be compared with the image formed by a plurality of mouse coordinates of real-time movement mouse events to determine whether it is a suspicious event.

In step S32, the processor 30 inputs a plurality of mouse coordinates of a plurality of training mouse events to a machine learning model through the training module 42 of the driver 21 to obtain critical data.

In one embodiment, the machine learning model can be, for example, deep learning, convolutional neural network, unsupervised/supervised machine learning, logistic regression, decision tree, etc., which is not limited herein.

Thus, the present invention can automatically generate critical data.

Figure 6:
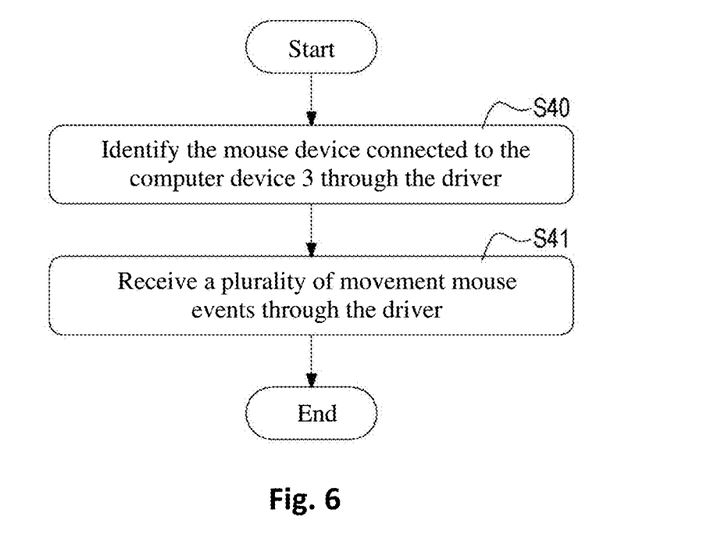
FIG. 6 is a partial flowchart of a detection method according to an embodiment of the present invention.

Please refer to FIG. 2 to FIG. 6. FIG. 6 is a partial flowchart of a detection method according to an embodiment of the present invention. Compared with the detection method of FIG. 4, the detection method in this embodiment further includes steps S40 to S41.

In step S40, the processor 30 identifies the mouse device 20 connected to the computer device 3 through the driver 21.

In step S41, the processor 30 receives a plurality of movement mouse events from the mouse device 20 through the driver 21.

It is noted that since the driver 21 is usually provided by the manufacturer of the mouse device 20, it can be used to identify the mouse device 20 and communicate with the mouse device 20.

Figure 7:
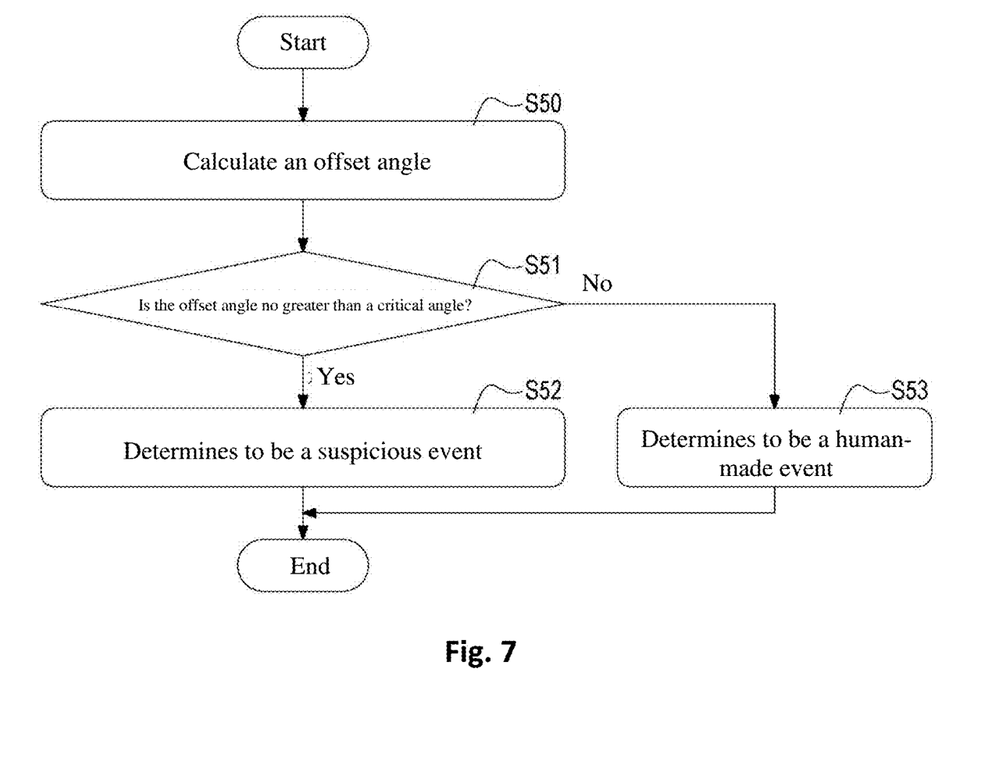
FIG. 7 is a partial flowchart of a detection method according to an embodiment of the present invention.

Please refer to FIG. 2 to FIG. 7. FIG. 7 is a partial flowchart of a detection method according to an embodiment of the present invention. Compared with the detection method of FIG. 4, the detection method in this embodiment further includes steps S50 to S53 for detecting suspicious events.

In step S50, the processor 30 calculates an offset angle of a plurality of consecutive mouse coordinates through the non-human movement detection module 40 of the driver 21.

In step S51, the processor 30 determines whether the offset angle is not greater than a critical angle through the non-human movement detection module 40 of the driver 21.

If the offset angle is not greater than the critical angle, step S52 is executed.

If the offset angle is greater than the critical angle, step S53 is executed.

In step S52, the processor 30 determines, through the non-human movement detection module 40 of the driver 21, that the corresponding movement mouse event is a suspicious event.

In step S53, the processor 30 determines, through the non-human movement detection module 40 of the driver 21, that the corresponding movement mouse event is a human-made event.

Figure 10A:
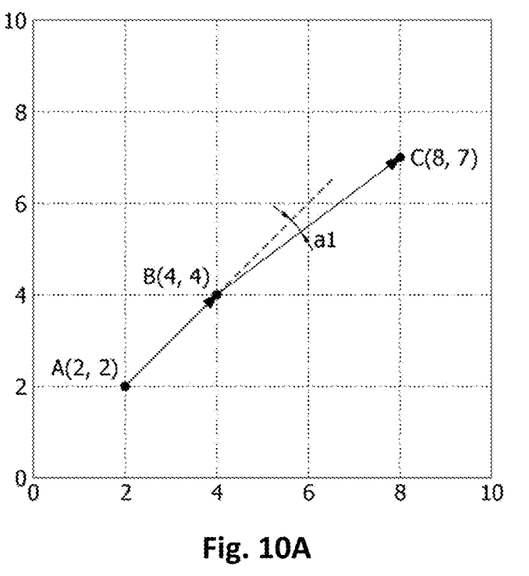
FIG. 10A is a schematic diagram of the coordinate changes of a non-human movement mouse event.
Figure 10B:
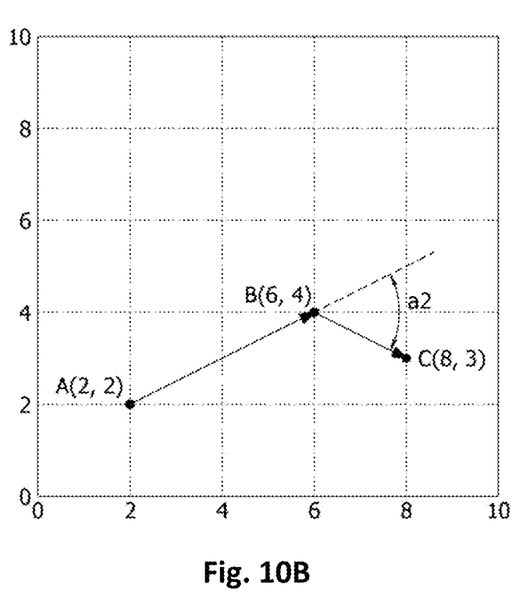
FIG. 10B is a schematic diagram of the coordinate changes of a human-made movement mouse event.

Please refer to FIG. 10A and FIG. 10B. FIG. 10A is a schematic diagram of the coordinate changes of a non-human movement mouse event. FIG. 10B is a schematic diagram of the coordinate changes of a human-made movement mouse event.

In this embodiment, the offset angle of three consecutive movement mouse events can be calculated.

In FIG. 10A, the three consecutive mouse coordinates are A(2, 2), B(4, 4), and C(8, 7). In this case, the offset angle a1 between the vector AB and the vector BC can be calculated.

When the offset angle a1 is not greater than the critical angle (for example, 10 degrees, it can be changed according to the user's sensitivity needs, for example, it can be adjusted to 5 degrees or 15 degrees), it can be determined that the corresponding three consecutive movement mouse events are suspicious events.

In FIG. 10B, the three consecutive mouse coordinates are A(2, 2), B(6, 4), and C(8, 3). In this case, the offset angle a2 between the vector AB and the vector BC can be calculated.

When the offset angle a2 is greater than the critical angle (for example, 10 degrees), it can be determined that the corresponding three consecutive movement mouse events are human-made events.

Figure 8:
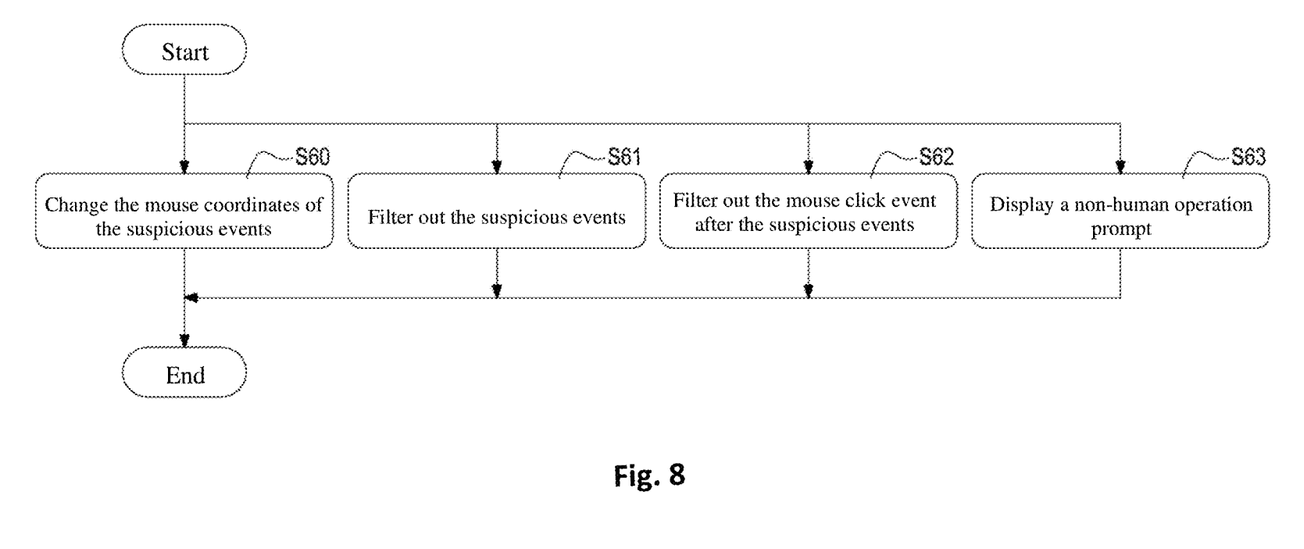
FIG. 8 is a partial flowchart of a detection method according to an embodiment of the present invention.

Please refer to FIG. 2 to FIG. 8. FIG. 8 is a partial flowchart of a detection method according to an embodiment of the present invention. Compared with the detection method of FIG. 4, the detection method in this embodiment further includes at least one of steps S60 to S63 for implementing interference.

In step S60, the processor 30 changes the mouse coordinates of the suspicious events through the interference module 41 of the driver 21, so that the operating system 301 moves the mouse pointer to reach the changed mouse coordinates, that is, causes the mouse pointer to offset.

In step S61, the processor 30 filters out the suspicious events through the interference module 41 of the driver 21, so that the operating system 301 does not execute the suspicious events, that is, ignores the non-human mouse events.

In step S62, the processor 30 filters out the mouse click event received after the suspicious events through the interference module 41 of the driver 21, so that the operating system 301 does not execute the mouse click event after the suspicious event. That is, the cheating user cannot execute subsequent operations (such as shooting operations, pickup operations, etc.) after moving to a target location.

In step S63, the processor 30 displays a non-human operation prompt on the display 32 through the interference module 41 of the driver 21, for example, popping out a prompt window to interrupt the operation of the cheating user.

In this way, the present invention can effectively interfere with cheating users to improve the fairness of the game.

The above-mentioned embodiments are only some preferred embodiments for fully illustrating the present invention. The scope of protection of the present invention is not limited to them. Equivalent substitutions or modifications can be made by a person skilled in the art on the basis of the present invention. All of these changes are within the scope of protection of the present invention. The scope of protection of the present invention is defined by the claims.

The invention claimed is:

1. A mouse, comprising:
   a mouse device, configured to electrically connect to a computer device and transmit a plurality of movement mouse events to the computer device when the mouse device is moved, wherein the plurality of movement mouse events comprises a plurality of mouse coordinates; and
   a driver configured for installation on the computer device, the driver comprising instructions, which when executed by the computer device cause the computer device to detect a non-human movement on the plurality of movement mouse events based on the plurality of mouse coordinates, and to determine not to execute the plurality of movement mouse events based on detecting that the plurality of movement mouse events are from a non-human movement of the mouse device, wherein the driver filters out the non-human movement as a suspicious event so that an operating system of the computer device does not execute the suspicious event.

2. The mouse according to claim 1, wherein the driver further comprises instructions to calculate an offset angle of three consecutive mouse coordinates, and upon determining that the offset angle is not greater than a critical angle, identifying the plurality of movement mouse events as a plurality of suspicious events, and identifying the plurality of movement mouse events as a plurality of human-made events upon a determination that the offset angle is greater than the critical angle.

3. The mouse according to claim 1, wherein not executing the plurality of movement mouse events further comprises at least one of the following:
   changing the mouse coordinates of identified suspicious events to cause the operating system of the computer device to move a mouse pointer to the changed mouse coordinates; filtering out the suspicious events so that the operating system does not execute the suspicious events;
   filtering out a click mouse event received after the suspicious events so that the operating system does not execute the click mouse event after the suspicious events; or
   displaying a non-human operation prompt.

4. The mouse according to claim 1, wherein the instructions, when executed, further cause the computer device to receive a plurality of training mouse events within an analysis time period, the plurality of training mouse events comprises a plurality of mouse coordinates, and execute a training process on the plurality of training mouse events to obtain at least one of a critical angle, a critical ratio, a critical cumulative number, a critical consecutive number, or a predetermined detection time period.

5. The mouse according to claim 4, wherein the training process comprises at least one of the following:
   analyzing mouse coordinates of the training mouse events to obtain at least one of the critical angle, the critical ratio, the critical cumulative number, the critical consecutive number, and a preset detection time period;
   analyzing an image formed by mouse coordinates of the training mouse events to obtain at least one of the critical angle, the critical ratio, the critical cumulative number, the critical consecutive number, and the preset detection time period; or
   inputting mouse coordinates of the training mouse events into a machine learning model to obtain at least one of the critical angle, the critical ratio, the critical cumulative number, the critical consecutive number, and the preset detection time period.

6. A method, comprising:
   receiving a plurality of movement mouse events of a mouse device of a computer device, wherein the plurality of movement mouse events comprises a plurality of mouse coordinates;
   executing a non-human movement detection on the plurality of movement mouse events based on the plurality of mouse coordinates to determine whether the plurality of movement mouse events are a plurality of suspicious events or a plurality of human-made events;
   executing an interference process based on a determination that the suspicious events meet a non-human critical condition, wherein the interference process comprises filtering out the suspicious events; and
   when the suspicious events do not meet the non-human critical condition, executing the plurality movement mouse events.

7. The method of claim 6, wherein receiving the plurality of movement mouse events comprises:
   identifying a mouse device connected to a computer device through a driver; and
   receiving the plurality of movement mouse events through the driver.

8. The method of claim 6, wherein executing the non-human movement detection comprises:
   calculating an offset angle of three consecutive mouse coordinates;
   when the offset angle is not greater than a critical angle, determining that the plurality of movement mouse events are the plurality of suspicious events; and
   when the offset angle is greater than the critical angle, determining that the movement mouse events are the plurality of human-made events.

9. The method of claim 6, wherein the non-human critical condition comprises at least one of the following:
   a ratio of the plurality of suspicious events to the plurality of movement mouse events received within a predetermined detection time period reaches a critical ratio;
   a cumulative number of the plurality of suspicious events received during the predetermined detection time reaches a critical cumulative number; or
   a consecutive number of the plurality of suspicious events reaches a critical consecutive number.

10. The method for detecting non-human mouse events according to claim 6, wherein the interference process comprises at least one of the following:
   changing the mouse coordinates of the plurality of suspicious events to cause an operating system of the computer device to move a mouse pointer to the changed mouse coordinates;
   filtering out the plurality of suspicious events so that the operating system does not execute the plurality of suspicious events;
   filtering out a click mouse event received after the plurality of suspicious events so that the operating system does not execute the click mouse event after the plurality of suspicious events; or
   displaying a non-human operation prompt.

11. The method of claim 6, further comprising at least one of the following prior to executing the non-human movement detection:

receiving a plurality of training mouse events during an analysis time period, wherein the plurality of training mouse events comprises a plurality of mouse coordinates; or executing a training process on the plurality of training mouse events to obtain at least one of a critical angle, a critical ratio, a critical cumulative number, a critical consecutive number, and a predetermined detection time period.

12. The method of claim 11, wherein the training process comprises at least one of the following:

analyzing the mouse coordinates of the training mouse events to obtain at least one of the critical angle, the critical ratio, the critical cumulative number, the critical consecutive number, and the preset detection time period;

analyzing an image formed by the mouse coordinates of the training mouse events to obtain at least one of the critical angle, the critical ratio, the critical cumulative number, the critical consecutive number, and the preset detection time period; or inputting the mouse coordinates of the training mouse events into a machine learning model to obtain at least one of the critical angle, the critical ratio, the critical cumulative number, the critical consecutive number, and the preset detection time period.

13. The mouse according to claim 1, wherein detecting a non-human movement comprises determining whether the plurality of movement mouse events are suspicious events or are human-made movement mouse events, and determining whether any determined suspicious events meet a determined non-human critical condition.

14. The mouse according to claim 13, wherein the instructions further comprise instructing the computer to execute an interference process based on a determination that the suspicious events do not meet the determined non-human critical condition.

* * * * *

UNITED STATES PATENT AND TRADEMARK OFFICE
CERTIFICATE OF CORRECTION

PATENT NO.         : 12,443,290 B2
APPLICATION NO.    : 18/724685
DATED              : October 14, 2025
INVENTOR(S)        : Thaddaeus Erasmus Georg Richard Tetzner et al.

It is certified that error appears in the above-identified patent and that said Letters Patent is hereby corrected as shown below:

In the Claims

Column 9, Lines 38-40 (Claim 3, Lines 7-9), remove the phrase "filtering out the suspicious events so that the operating system does not execute the suspicious events;".

Column 10, Lines 54-56 (Claim 10, Lines 8-10), remove the phrase "filtering out the plurality of suspicious events so that the operating system does not execute the plurality of suspicious events;".

Signed and Sealed this
Thirtieth Day of December, 2025

John A. Squires
*Director of the United States Patent and Trademark Office*